US007158868B2

(12) United States Patent
Damitz et al.

(10) Patent No.: US 7,158,868 B2
(45) Date of Patent: Jan. 2, 2007

(54) METHOD AND DEVICE FOR CONSISTENT BIDIRECTIONAL ANALYSIS OF ENGINE CHARACTERISTICS MAP DATA

(75) Inventors: Jens Damitz, Illingen (DE); Andreas Huber, Steinheim (DE); Volker Stuerzl, Stuttgart (DE); Juergen Biester, Boeblingen (DE); Peter Schmitt, Schwieberdingen (DE); Andre Schoenegge, Goeteborg (DE); Dirk Samuelsen, Ludwigsburg (DE); Ruediger Fehrmann, Leonberg (DE); Lutz-Martin Fink, Pecetto Torinese (IT)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 10/479,947

(22) PCT Filed: Jun. 26, 2002

(86) PCT No.: PCT/DE02/02303

§ 371 (c)(1), (2), (4) Date: Apr. 29, 2004

(87) PCT Pub. No.: WO03/002863

PCT Pub. Date: Jan. 9, 2003

(65) Prior Publication Data

US 2004/0176886 A1 Sep. 9, 2004

(30) Foreign Application Priority Data

Jun. 27, 2001 (DE) ................................ 101 30 646

(51) Int. Cl.
*G06F 7/00* (2006.01)

(52) U.S. Cl. .......................................... 701/29; 701/33

(58) Field of Classification Search .................. 701/29, 701/33, 36, 51
See application file for complete search history.

(56) References Cited

U.S. PATENT DOCUMENTS 4,676,215 A * 6/1987 Blocher et al. ........ 123/339.19
5,713,332 A 2/1998 Tolle et al.

FOREIGN PATENT DOCUMENTS

DE 43 04 441 8/1994
DE 44 34 455 3/1996
DE 198 05 368 8/1999

* cited by examiner

*Primary Examiner*—Y. Beaulieu
(74) *Attorney, Agent, or Firm*—Kenyon & Kenyon LLP

(57) ABSTRACT

A method and a device (10) for consistent bidirectional analysis of engine characteristics map data in an engine characteristics map are described. The engine characteristics map data represents interlinked technical variables. In this method, first a characteristic curve representing the interdependence of two of the technical variables is determined. This characteristic curve forms the basis for additional conversions in bidirectional analysis of the particular engine characteristics map.

8 Claims, 3 Drawing Sheets

METHOD AND DEVICE FOR CONSISTENT BIDIRECTIONAL ANALYSIS OF ENGINE CHARACTERISTICS MAP DATA

FIELD OF THE INVENTION

The present invention relates to a method and a device for consistent bidirectional analysis of engine characteristics map data. In addition, the present invention relates to a computer program and a computer program product for implementing the method according to the present invention.

BACKGROUND INFORMATION

In control units used in motor vehicles, properties of subsystems must be simulated to determine state variables which are important for regulators, for example, and are not directly measurable or are not measured for cost reasons online.

Two different approaches are known for modeling in control units. In the first approach, relevant technical physical system properties are simulated by a mathematical model, such as a differential equation system. The second possibility is by explicit storage of the system information of interest as a function of relevant influencing parameters in an engine characteristics map. Relationships among a plurality of influencing parameters are represented in such an engine characteristics map.

For use in a motor vehicle in particular, the characteristics map representation has advantages in terms of both the demand on computation time as well as simplification of the calibration. This is due to the fact that a complex model computation is not necessary, and instead the desired values are obtained directly from the engine characteristics map.

The use of engine characteristics maps is described in German Patent Application No. DE 198 03 853, for example, which describes a method and a device for regulating the intake air temperature of an internal combustion engine. The device described therein ensures that a cooling device is turned on and off so as to achieve optimum engine efficiency. This assumes that the firing angle efficiency is an indicator of the knocking tendency of the engine and that the firing angle efficiency is determined as a function of the engine speed and the engine load to adjust an optimum setpoint torque of the engine by varying the filling and the firing angle setting.

It is often necessary to analyze engine characteristics map data in two directions. This means that an inversion of the engine characteristics map is necessary in analysis of a first engine characteristics map KF1: x3=f(x1, x2)

and a second engine characteristics map

KF2: x2=f(x1, x3).

Thus, the desired engine characteristics map x2=f(x1, x3)

is generated from the given database x3=f(x1, x2)

by interpolation on the basis of predetermined interpolation points x3i.

Interpolation points are predetermined value pairs which are determined empirically or by computation and therefore constitute the basic grid in the engine characteristics map.

However, one disadvantage of the conventional engine characteristics map inversion is that when both conversions must be performed directly in succession one after the other in one step of the computation grid, namely X30'=f(x10, x20), x20'=f(x10, x30'), consistency cannot be ensured under all boundary conditions, i.e., x20 is not identical to x20'.

The reason for this lies in the generation of a fixed interpolation point grid in generating the second engine characteristics map from the first engine characteristics map. Depending on the position of x20 and the interpolation point grid, x30' in the reverse calculation is situated in an interpolation field defined by the interpolation points of the second engine characteristics map, which were used as interpolation points for the interpolation on other interpolation points of the starting database of the first engine characteristics map. Consequently, in analysis of the second engine characteristics map, different interpolation points have an influence on the x20' result than in analysis of the first engine characteristics map for the x30' result.

SUMMARY

In accordance with the present invention, a method for consistent bidirectional analysis of engine characteristics map data representing interlinked technical variables in an engine characteristics map is provided. In the method according to the present invention, a characteristic curve is first determined, which reflects the interdependence between two of the technical variables. A constant value is preselected for each of the other technical variables. The characteristic curve thus determined is used as the basis for additional conversions in bidirectional analysis of the particular engine characteristics map.

Since both analysis directions are based on an identical database in the form of a temporarily valid characteristic curve generated, consistency may be ensured in both conversions.

In an example embodiment of the present invention, the characteristic curve is determined by interpolation between interpolation points of the technical variables to be preselected as constant.

This method is advantageous in particular when the engine characteristics map data represents three interlinked technical variables in the engine characteristics map. The characteristic curve thus determined then represents two of these variables as a function of a third variable, which is a constant. In this case, the first technical variable is a torque, for example, the second technical variable is an injection quantity and the third technical variable is an engine speed.

An example device according to the present invention for consistent bidirectional analysis of engine characteristics map data representing interlinked technical variables in an engine characteristics map is used in particular for implementing the method according to the present invention.

This device has a computation unit and a memory unit. At least one engine characteristics map having interpolation points which define this map is stored in the memory unit. The computation unit is designed to determine, on the basis of the engine characteristics map, data for each engine characteristics map, a characteristic curve to be used as the basis for additional conversion in bidirectional analysis of the engine characteristics map in question.

An example computer program according to the present invention includes program code means for performing the steps of the method according to the present invention when the computer program is executed on a computer or a corresponding computation unit. It is typically stored on a computer-readable data carrier. Suitable data carriers include EEPROMs and flash memories as well as CD-ROMs, diskettes or hard drives.

The example device according to the present invention is used for converting a limiting quantity into a limiting torque, for example, taking into account an engine speed in a control unit for controlling an internal combustion engine.

Other advantages and embodiments of the present invention are derived from the description and the accompanying drawings.

It is self-evident that the features mentioned above and those to be explained below may be used not only in the particular combination described but also in any other combinations or alone without going beyond the scope of the present invention.

BRIEF DESCRIPTION OF THE DRAWINGS

The present invention is illustrated in the drawings on the basis of exemplary embodiments and is explained in greater detail below with reference to the drawings.

DETAILED DESCRIPTION OF EXAMPLE EMBODIMENTS

Figure 1:
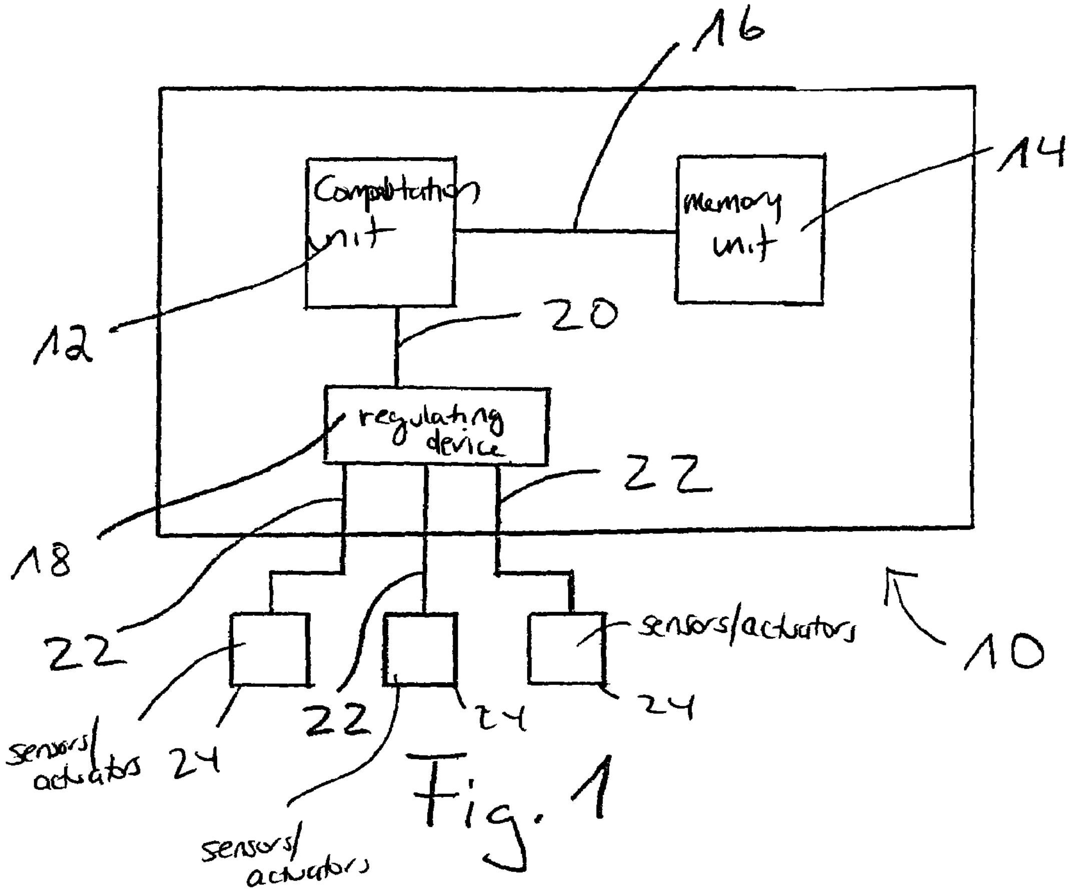
FIG. 1 shows a schematic diagram of an example embodiment of the device according to the present invention.

FIG. 1 shows schematically an example device according to the present invention, labeled as 10 on the whole. Device 10 is a control unit used in a motor vehicle, for example.

Control unit 10 has a computation unit 12 and a memory unit 14. Computation unit 12 and memory unit 14 are interconnected via databus 16. In addition, a regulating device 18 is connected to computation unit 12 via a communications bus 20 and via bidirectional control buses 22 to sensors and actuators 24 for monitoring and controlling different operating variables and variables of state of the internal combustion engine to be controlled.

A number of engine characteristics maps are stored in memory device 14, each map describing the interdependencies of various technical parameters. For each of these engine characteristics maps, computation unit 12 determines as needed a characteristic curve, which functions as the basis for conversions within the scope of a bidirectional analysis of the particular engine characteristics map. The values thus determined are input variables of regulating device 18 for monitoring, controlling and regulating various operating variables via sensors and actuators 24.

Figure 2:
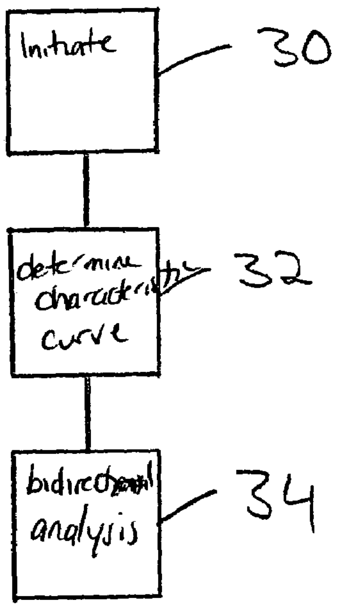
FIG. 2 shows a flow chart of an example embodiment of the method according to the present invention.

FIG. 2 shows a flow chart of the steps of an example method according to the present invention. The method is initiated in step 30, i.e., it is shown that one or more certain technical variables, e.g., controlled variables, are to be determined. In a next step 32, a characteristic curve is determined in an engine characteristics map which represents the technical variables to be determined as a function of other technical variables. In a step 34, this characteristic curve forms the basis for additional conversion calculations in bidirectional analysis of the engine characteristics map.

In the following figures, the example method according to the present invention is compared with a traditional method in a concrete application to illustrate the advantages associated with the method according to the present invention.

The application presented here is the conversion of a limiting injection quantity to a limiting torque, and conversion back to the instantaneous setpoint quantity for the case when the torque limitation is in effect, i.e., the setpoint torque is equal to the limiting torque.

The figures show torque trq, injection quantity q and engine speed n.

Figure 3:
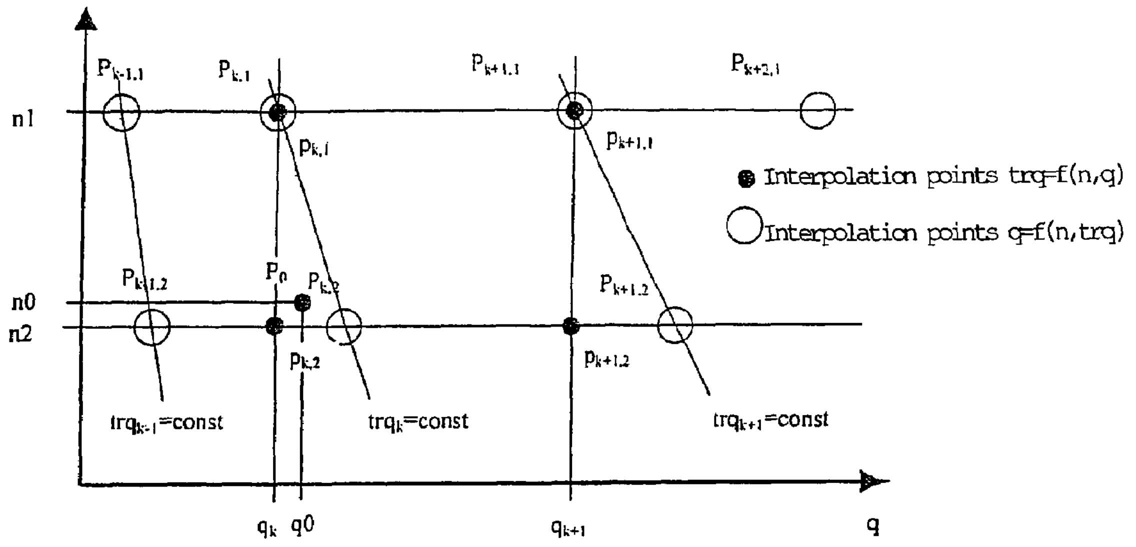
FIG. 3 shows a diagram of bidirectional analysis of an engine characteristics map according to the related art.

FIG. 3 shows a diagram of bidirectional analysis of an engine characteristics map according to the related art. In particular, it shows interpolation points p for trq=f(n, q)

and for q=f(n, trq).

The diagram shown here illustrates the problems in the traditional engine characteristics map inversion. In the (n, q) interpolation point grid, the interpolation result $trq_0=f(n_0, q_0)$ is influenced by the points $P_{k,1}$; $P_{k+1,1}$; $P_{k,2}$; $P_{k+1,2}$.

However, interpolation result $q_0=f(n_0, trq_0)$ in the (n, trq) interpolation point grid is influenced by the points $P_{k-1,1}$; $P_{k,1}$; $P_{k-1,2}$; $P_{k,2}$.

It is clear here that different interpolation points of the starting database may be used in the reverse calculation, and therefore consistency cannot be ensured.

In the example method according to the present invention, the basis for the two conversions trq=>q and q=>trq is an applied engine characteristics map KF1: q=f(n, trq), which describes the relationship between the quantity injected and the torque delivered by the engine at a certain engine speed. The conversion trq=>q and then q=>trq at instantaneous engine speed n0 is performed as described below.

Figure 4:
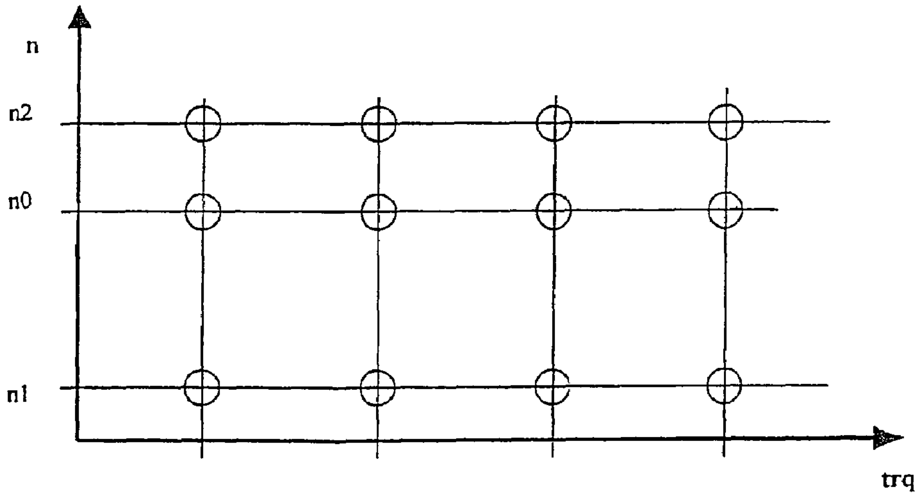
FIGS. 4 through 6 show diagrams of the bidirectional analysis of an engine characteristics map according to the example method according to the present invention.

As shown in FIG. 4, first an interval n1–n2, where n1<n0<n2 is sought in the interpolation point vector of KF1. Subsequently, a characteristic curve KL: q=f(n0, trq)

is generated by interpolation in n between all interpolation points (n1, trq) and (n2, trq).

Figure 5:
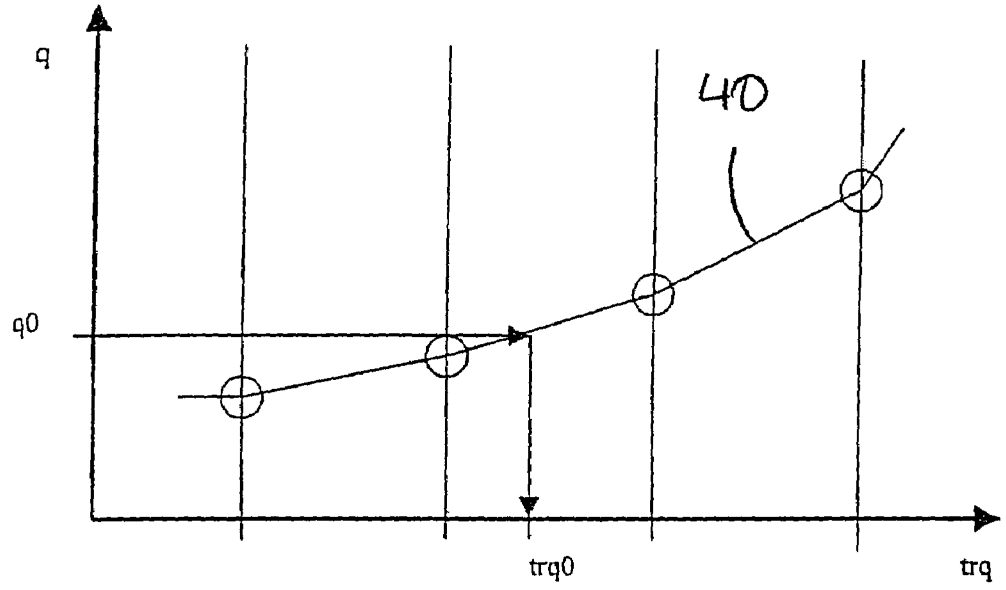
Figure 6:
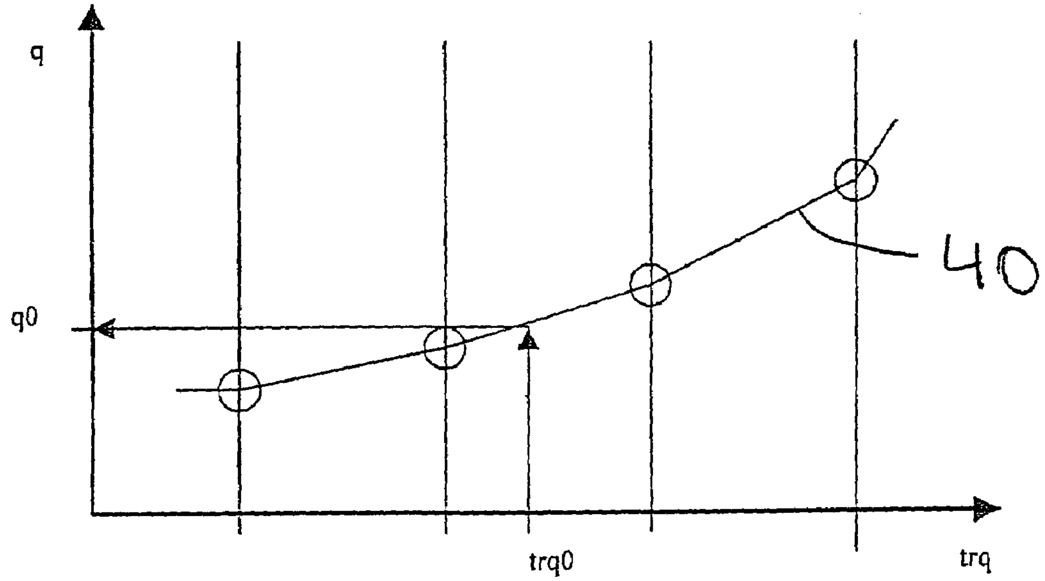

The characteristic curve thus generated, labeled as 40 in FIGS. 5 and 6, forms the basis for all conversion calculations trq=>q and q=>trq in the instantaneous computation step with n=n0=const.

The conversion q=>trq is performed as follows:

Interpretation of q=f(n0, trq) as trq=f(n0, q), i.e., axis change of the characteristic curve (40). The characteristic curve analysis of trq=f(n0, q)

by interpolation in q yields the following, as depicted in FIG. 5:

trq0=f(n0, q0).

Conversion of trq=>q is performed as follows:

characteristic curve analysis of q=f(n0, trq)

by interpolation in trq yields the following, as depicted in FIG. 6:

q0=f(n0, trq0).

The example method according to the present invention is characterized in that for both directions of analysis trq=>q and q=>trq, the same database q=f(n0, trq)/trq=f(n0, q)

is used. Consequently there are no inconsistent areas. This ensures that the limiting quantity is correctly maintained.

Although the present method has been described for a particular application, it is of course also applicable to other variables, in particular all n-dimensional engine characteristics maps.

What is claimed is:

1. A method for consistent bidirectional analysis of engine characteristics map data representing interlinked technical variables in an engine characteristics map, comprising:

determining a characteristic curve representing an interdependence of two of the technical variables, a constant value being preselected for each of the other technical variables; and using the determined characteristic curve as a basis for conversion calculations in bidirectional analysis of the engine characteristics map.

2. The method as recited in claim 1, wherein the characteristic curve is determined by interpolation between interpolation points of the technical variables to be preselected as constant.

3. The method as recited in claim 1, wherein the engine characteristics map data in the engine characteristics map represents three interlinked technical variables.

4. The method as recited in claim 3, wherein a first one of the technical variables is a torque, a second one of the technical variables is an injection quantity, and a third one of the technical variable is an engine speed.

5. A device for consistent bidirectional analysis of engine characteristics map data representing interlinked technical variables in an engine characteristics map, comprising:

a memory unit, at least one engine characteristics map being stored in the memory unit; and a computation unit configured to determine a characteristic curve for each engine characteristics map in the memory unit, the characteristic curve being used as the basis for conversions in bidirectional analysis of the engine characteristics map.

6. A computer program having program code, the computer program, when executed on a computation unit, causing the computation unit to perform the following:

determining a characteristic curve representing an interdependence of two of interlinked technical variables in an engine characteristics map, a constant value being preselected for each of the other technical variables; and using the determined characteristic curve as a basis for conversion calculations in bidirectional analysis of the engine characteristics map.

7. A computer program product having program code stored on a computer-readable data carrier, the computer program code, when executed on a computation device, causing the computation unit to perform the following:

determining a characteristic curve representing an interdependence of two of interlinked technical variables in an engine characteristics map, a constant value being preselected for each of the other technical variables, and using the determined characteristic curve as a basis for conversion calculations in bidirectional analysis of the engine characteristics map.

8. A method for converting a limiting quantity into a limiting torque, taking into account an engine speed in a control unit for controlling an engine, comprising:

providing a memory unit which stores an engine characteristics map;

using the control unit to determine a characteristic curve for the engine characteristics in the memory unit, the characteristic curve being used as the basis for conversion calculations in bidirectional analysis of the engine characteristics map.

* * * * *